US011626925B2

(12) United States Patent
Hara

(10) Patent No.: US 11,626,925 B2
(45) Date of Patent: Apr. 11, 2023

(54) OPTICAL TRANSFER SYSTEM, OPTICAL TRANSMITTER, AND OPTICAL COMMUNICATION METHOD

(71) Applicant: NEC Corporation, Tokyo (JP)

(72) Inventor: Yasushi Hara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/432,250

(22) PCT Filed: Mar. 18, 2020

(86) PCT No.: PCT/JP2020/011875
§ 371 (c)(1),
(2) Date: Aug. 19, 2021

(87) PCT Pub. No.: WO2020/196129
PCT Pub. Date: Oct. 1, 2020

(65) Prior Publication Data
US 2022/0190925 A1 Jun. 16, 2022

(30) Foreign Application Priority Data
Mar. 25, 2019 (JP) .............................. JP2019-056434

(51) Int. Cl.
H04B 10/61 (2013.01)
H04B 10/50 (2013.01)

(52) U.S. Cl.
CPC ......... H04B 10/5057 (2013.01); H04B 10/61 (2013.01); H04B 10/6163 (2013.01)

(58) Field of Classification Search
None
See application file for complete search history.

(56) References Cited

U.S. PATENT DOCUMENTS 4,114,136 A * 9/1978 D'Albora ................ G01S 15/50
367/901
5,471,336 A 11/1995 Onaka et al.
(Continued)

FOREIGN PATENT DOCUMENTS

JP H05-48540 A 2/1993
JP 2014-220570 A 11/2014
(Continued)

OTHER PUBLICATIONS

International Search Report for PCT Application No. PCT/JP2020/011875, dated Jun. 23, 2020.
(Continued)

Primary Examiner — Jai M Lee
(74) Attorney, Agent, or Firm — Sughrue Mion, PLLC

(57) ABSTRACT

In order to stabilize the characteristics of reception of an optical signal received via a transfer path, this optical receiver is provided with: a local beam output means 1; a light receiving means 2; a photoelectric conversion means 3; a measuring means 4; a control means 5; and a comparing means 6, the comparing means 6, when the control means 5 sweeping the wavelength of the local beam in a predetermined wavelength range with respect to the central wavelength of the optical signal, generating difference data between a spectrum based on a result of the measuring, by the measuring means 4, of the electric signal in accordance with a change in the wavelength of the local beam and a preset reference spectrum.

7 Claims, 7 Drawing Sheets

(56) References Cited

U.S. PATENT DOCUMENTS

| | | | | |
|---|---|---|---|---|
| 7,113,700 | B2* | 9/2006 | Shimizu | H04J 14/0221 398/4 |
| 8,249,464 | B2* | 8/2012 | Oda | H04B 10/60 398/208 |
| 8,391,725 | B2* | 3/2013 | Oda | H04B 10/60 398/202 |
| 8,818,190 | B2* | 8/2014 | Hayashi | H04B 10/07955 398/94 |
| 9,037,002 | B2* | 5/2015 | Tanaka | H04J 14/0221 398/94 |
| 9,407,396 | B2* | 8/2016 | Ishikawa | H04J 14/0224 |
| 9,450,680 | B2* | 9/2016 | Sakai | H04B 10/63 |
| 9,537,570 | B2* | 1/2017 | Mizuguchi | H04B 10/5053 |
| 9,673,929 | B2* | 6/2017 | Yamashita | H04B 10/07955 |
| 9,762,333 | B2* | 9/2017 | Komatsu | H04B 10/674 |
| 10,554,302 | B2* | 2/2020 | Binkai | H04B 10/0799 |
| 11,153,024 | B2* | 10/2021 | Inoue | H04B 10/50 |
| 2005/0265730 | A1* | 12/2005 | Yasue | H04B 10/564 398/183 |
| 2007/0003280 | A1* | 1/2007 | Sada | H04B 10/66 398/27 |
| 2009/0226189 | A1* | 9/2009 | Ito | H04B 10/65 398/202 |
| 2010/0111544 | A1 | 5/2010 | Oda et al. | |
| 2014/0323588 | A1 | 11/2014 | Sakai et al. | |
| 2016/0164624 | A1 | 6/2016 | Yamauchi | |
| 2016/0285548 | A1 | 9/2016 | Nishihara et al. | |
| 2017/0019179 | A1* | 1/2017 | Bhoja | H04B 10/2507 |
| 2017/0264371 | A1* | 9/2017 | Fukui | H04B 10/506 |
| 2018/0175933 | A1 | 6/2018 | Nomura et al. | |
| 2018/0188456 | A1 | 7/2018 | Tomita | |
| 2019/0312640 | A1 | 10/2019 | Binkai et al. | |
| 2020/0036446 | A1 | 1/2020 | Ge et al. | |
| 2020/0153534 | A1* | 5/2020 | Yamauchi | H04B 10/615 |

FOREIGN PATENT DOCUMENTS

| | | |
|---|---|---|
| JP | 5874896 B2 | 3/2016 |
| JP | 2018-101833 A | 6/2018 |
| JP | 2020-017836 A | 1/2020 |
| WO | 00/027055 A1 | 5/2000 |
| WO | 2015/087448 A1 | 6/2015 |
| WO | 2018/016055 A1 | 12/2018 |

OTHER PUBLICATIONS

English translation of Written opinion for PCT Application No. PCT/JP2020/011875, dated Jun. 23, 2020.
Extended European Search Report for EP Application No. 20776767.4 dated Mar. 4, 2022.

* cited by examiner

OPTICAL TRANSFER SYSTEM, OPTICAL TRANSMITTER, AND OPTICAL COMMUNICATION METHOD

This application is a National Stage Entry of PCT/JP2020/011875 filed on Mar. 18, 2020, which claims priority from Japanese Patent Application 2019-056434 filed on Mar. 25, 2019, the contents of all of which are incorporated herein by reference, in their entirety.

TECHNICAL FIELD

The present invention relates to an optical communication technique, and more particularly, to a transfer quality of an optical signal.

BACKGROUND ART

An optical communication system of transferring an optical signal over a long distance includes an optical amplifier as a repeater on a transfer path, but signal deterioration due to optical noise being output from the optical amplifier occurs. Therefore, it is desirable that the optical signal is transferred with highest possible optical power.

However, a signal with high optical power tends to cause waveform distortion due to a nonlinear effect of an optical fiber of the transfer path. Therefore, a transfer characteristic of the high-power optical signal is deteriorated by the waveform distortion. Thus, when an optical signal is transferred via a long-distance transfer path using an optical fiber, it is desirable to suppress waveform distortion while transferring the optical signal with high optical power.

As a method of suppressing waveform distortion while transferring an optical signal with high optical power, a technique of flatly shaping a spectrum in such a way as to suppress peak power in a signal band is used. As such a technique of flattening a spectrum of an optical signal, for example, a technique as in PTL 1 is disclosed.

PTL 1 relates to an optical transmitter having a function of performing spectral shaping of a signal. The optical transmitter of PTL 1 includes a filter that performs filter processing on an electric signal, a control unit that controls the filter, and an optical signal generation unit that generates an optical signal, based on the electric signal subjected to filter processing. In PTL 1, a spectrum of a signal is controlled by filter processing.

CITATION LIST

Patent Literature

[PTL 1] Japanese Unexamined Patent Application Publication No. 2018-101833

SUMMARY OF INVENTION

Technical Problem

However, the technique of PTL 1 is not sufficient in the following points. In PTL 1, waveform shaping of a signal for transmission is performed based on a set condition. However, PTL 1 does not consider a waveform of an optical signal in a case of being actually received on a side of an optical receiver. For this reason, there is a fear that a technique of performing waveform shaping in such a way as to maintain a reception characteristic on the reception side may be insufficient in a case where a characteristic of each device on a transfer path or a change with time of the characteristic has a large influence on the reception characteristic as in an optical communication system via a long-distance transfer path.

In order to solve the above-mentioned problem, an object of the present invention is to provide an optical receiver capable of stabilizing a reception characteristic of an optical signal to be received via a transfer path.

Solution to Problem

In order to solve the above-mentioned problem, an optical receiver according to the present invention includes a local beam output means, a light receiving means, a photoelectric conversion means, a measuring means, a control means, and a comparing means. The local beam output means outputs a local beam by changing a wavelength thereof. The light receiving means receives the optical signal being input via the transfer path by interfering the optical signal with the local beam, and outputs the received optical signal as a received optical signal. The photoelectric conversion means converts the received optical signal into an electric signal. The measuring means measures the electric signal converted by the photoelectric conversion means. The control means controls a wavelength of the local beam. When the control means sweeps the wavelength of the local beam within a predetermined wavelength range around a center wavelength of the optical signal, the comparing means generates difference data between a spectrum based on a result of measuring, by the measuring means, the electric signal in response to a change in the wavelength of the local beam, and a preset reference spectrum.

An optical communication method according to the present invention includes: outputting a local beam; and receiving an optical signal being input via a transfer path by interfering the optical signal with the local beam and outputting the received optical signal as a received optical signal. The optical communication method according to the present invention further includes converting the received optical signal into an electric signal. The optical communication method according to the present invention further includes sweeping a wavelength of the local beam within a predetermined wavelength range around a center wavelength of the optical signal, and measuring the electric signal for each wavelength of the local beam. The optical communication method according to the present invention further includes generating difference data between a spectrum based on a result of measuring the electric signal in response to a change in the wavelength of the local beam, and a preset reference spectrum.

Advantageous Effects of Invention

According to the present invention, it is possible to stabilize a reception characteristic of an optical signal to be received via a transfer path.

EXAMPLE EMBODIMENT

First Example Embodiment

Figure 1:
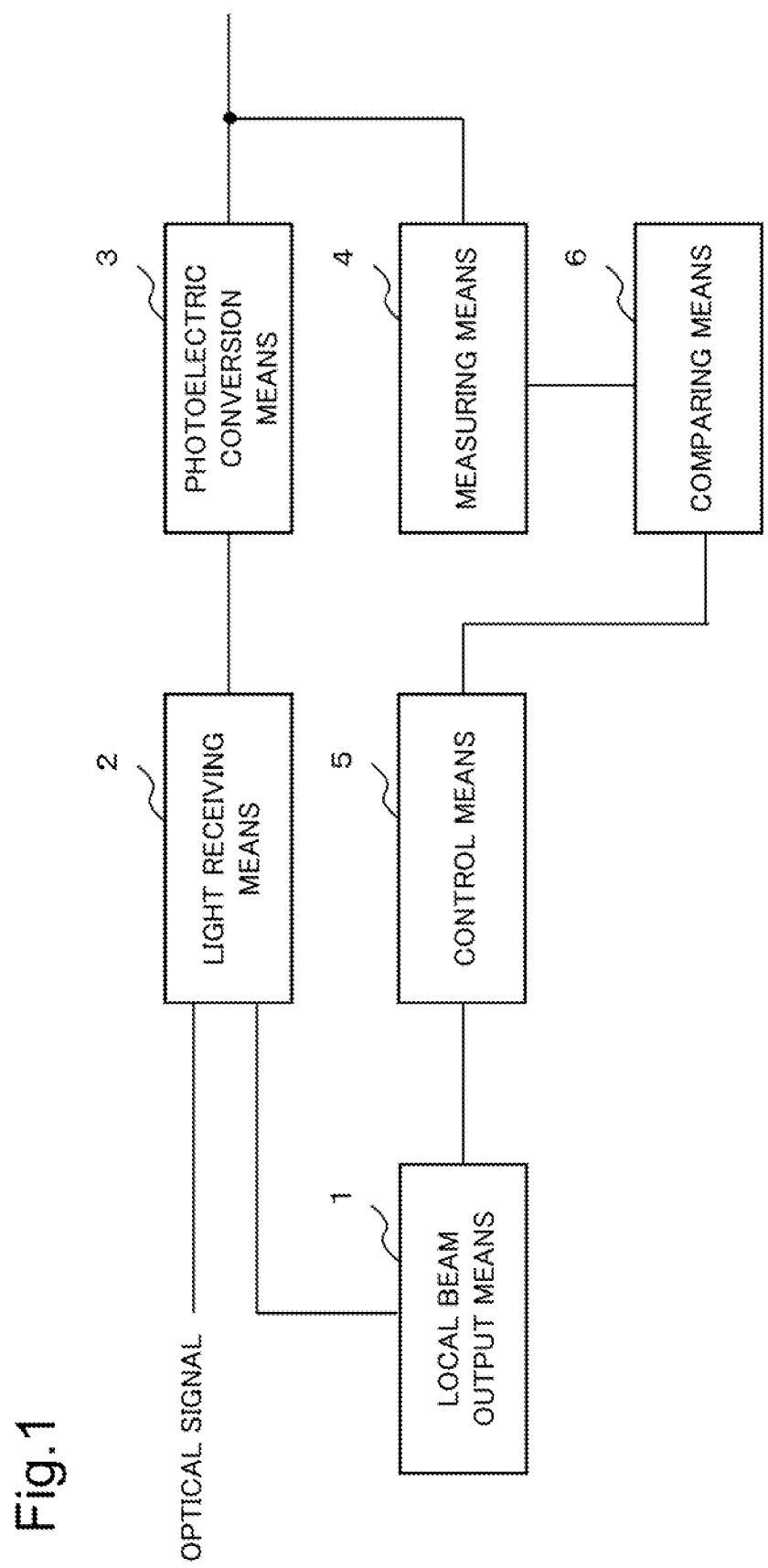
FIG. 1 is a diagram illustrating an outline of a configuration according to a first example embodiment of the present invention.

A first example embodiment of the present invention will be described in detail with reference to a drawing. FIG. 1 illustrates an outline of a configuration of an optical receiver according to the present example embodiment. The optical receiver according to the present example embodiment includes a local beam output means 1, a light receiving means 2, a photoelectric conversion means 3, a measuring means 4, a control means 5, and a comparing means 6. The local beam output means 1 outputs a local beam by changing a wavelength of the local beam. The light receiving means 2 receives an optical signal being input via a transfer path by interfering the optical signal with the local beam, and outputs the received optical signal as a received optical signal. The photoelectric conversion means 3 converts the received optical signal into an electric signal. The measuring means 4 measures the electric signal converted by the photoelectric conversion means 3. The control means 5 controls a wavelength of the local beam. When the control means 5 sweeps the wavelength of the local beam within a predetermined wavelength range around a center wavelength of the optical signal, the comparing means 6 generates difference data between a spectrum based on a result of measuring, by the measurement means 4, the electric signal in response to a change in the wavelength of the local beam, and a preset reference spectrum.

In the optical receiver according to the present example embodiment, the control means 5 sweeps the wavelength of the local beam, and the measuring means 4 measures the electric signal acquired by the photoelectric conversion means 3 converting the received optical signal. Thus, by sweeping the wavelength of the local beam and measuring the electric signal converted from the optical signal, a spectrum associated to the optical signal being input via the transfer path can be acquired. In the optical receiver according to the present example embodiment, the comparing means 6 generates difference data between the spectrum based on the measurement result and a preset reference spectrum. By acquiring the difference data between the spectrum based on the measurement result and the preset reference spectrum, it becomes possible to appropriately correct the spectrum of the optical signal to be transmitted on a transmission side according to the reception characteristic. As a result, by using the optical receiver according to the present example embodiment, it is possible to stabilize the reception characteristic of the optical signal to be received via the transfer path.

Second Example Embodiment

Figure 2:
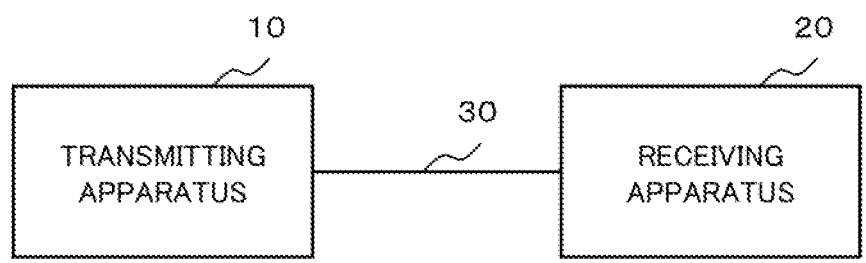
FIG. 2 is a diagram illustrating an outline of a configuration according to a second example embodiment of the present invention.

A second example embodiment of the present invention will be described in detail with reference to drawings. FIG. 2 illustrates an outline of a configuration of an optical transfer system according to the present example embodiment. The optical transfer system according to the present example embodiment includes a transmitting apparatus 10 and a receiving apparatus 20. The transmitting apparatus 10 and the receiving apparatus 20 are connected to each other via a transfer path 30.

The optical transfer system according to the present example embodiment is an optical communication system that transfers a wavelength multiplexed signal from the transmitting apparatus 10 to the receiving apparatus 20 via the transfer path 30. The optical transfer system according to the present example embodiment is configured as an optical communication system of a digital coherent method.

Figure 3:
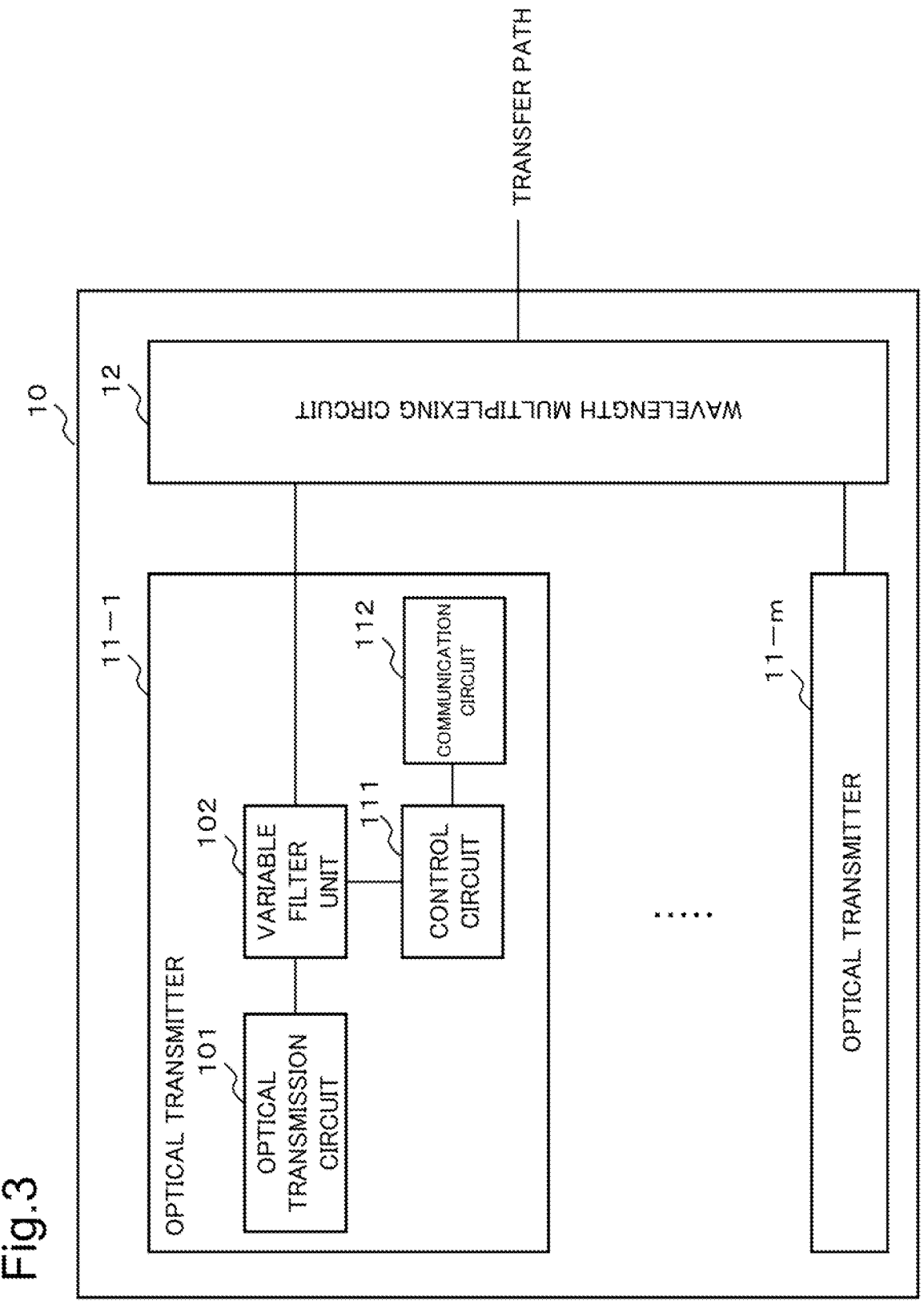
FIG. 3 is a diagram illustrating a configuration of a transmitting apparatus according to the second example embodiment of the present invention.

A configuration of the transmitting apparatus 10 will be described. FIG. 3 illustrates the configuration of the transmitting apparatus 10 according to the present example embodiment. The transmitting apparatus 10 according to the present example embodiment includes optical transmitters 11 and a wavelength multiplexing circuit 12. The transmitting apparatus 10 according to the present example embodiment includes m optical transmitters 11 from an optical transmitter 11-1 to an optical transmitter 11-$m$. A wavelength of a main signal is assigned to each of the optical transmitters 11, based on a wavelength design of the optical transfer system. Each of the optical transmitters 11 generates and outputs an optical signal associated to one channel.

Each configuration of the optical transmitters 11 will be described. The optical transmitters 11 each include an optical transmission circuit 101, a variable filter unit 102, a control circuit 111, and a communication circuit 112.

The optical transmission circuit 101 encodes a main signal to be transmitted and generates a phase modulated signal suitable for digital coherent communication. The optical transmission circuit 101 includes a light source, a modulator, and a signal processing circuit. The optical transmission circuit 101 performs phase modulation on continuous light being output from the light source by the modulator, based on data encoded by the signal processing circuit, and outputs the modulated continuous light. A wavelength of the optical signal being output from the optical transmission circuit 101 is set for each of the optical transmitters 11, based on the wavelength design of the optical transfer system. In addition, the optical transmission circuit 101 separates the continuous light into an X-polarized wave and a Y-polarized wave, performs phase modulation in a state in which the polarized waves are each different in phase by 90 degrees in the modulator, and multiplexes and outputs the resultant. As the modulator, for example, a Mach-Zehnder type modulator is used.

The variable filter unit 102 adjusts an intensity of the optical signal being input from the optical transmission circuit 101, based on control of the control circuit 111. For example, a wavelength selective switch (WSS) can be used as the variable filter unit 102. The WSS is configured by using liquid crystal on silicon (LCOS) or micro electro mechanical systems (MEMS). The variable filter unit 102 may be a unit other than the WSS as long as a transmittance of light can be adjusted for each wavelength.

The control circuit 111 controls the transmittance at each wavelength of the variable filter unit 102. The control circuit 111 sets the transmittance of the variable filter unit 102, based on a control signal to be received from the receiving apparatus 20 via the communication circuit 112. The control circuit 111 controls the variable filter unit 102, based on the set transmittance.

The communication circuit 112 receives a control signal transmitted from the receiving apparatus 20. The communication circuit 112 converts the received control signal into a signal format to be used inside the optical transmitter 11, and outputs the converted signal to the control circuit 111.

The wavelength multiplexing circuit 12 multiplexes optical signals being input from each of the optical transmitters 11 and outputs a wavelength multiplexed signal. The wavelength multiplexing circuit 12 is configured by using, for example, arrayed waveguide grating (AWG).

Figure 4:
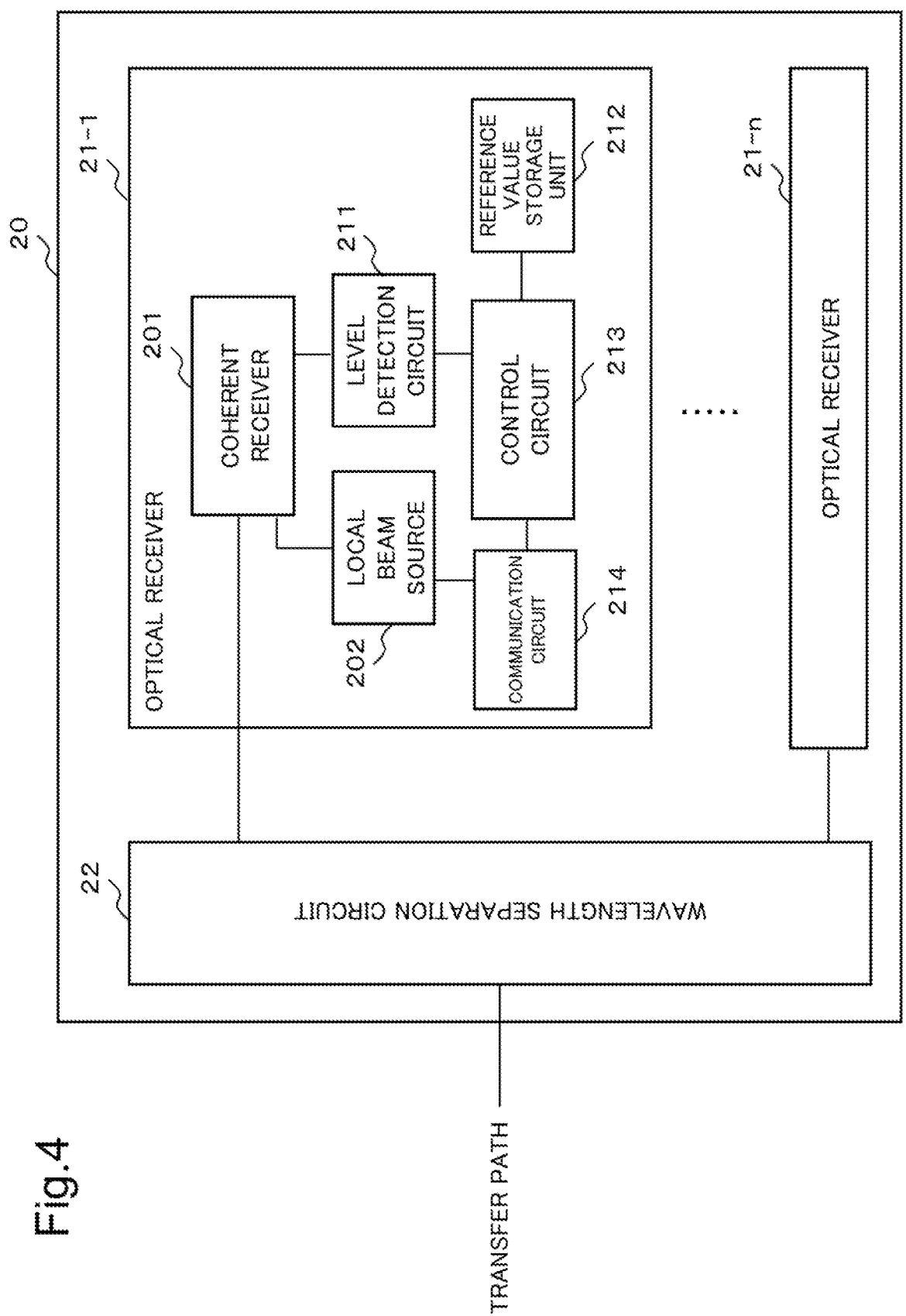
FIG. 4 is a diagram illustrating a configuration of a receiving apparatus according to the second example embodiment of the present invention.

A configuration of the receiving apparatus 20 will be described. FIG. 4 illustrates the configuration of the receiving apparatus 20 according to the present example embodiment. The receiving apparatus 20 according to the present example embodiment includes optical receivers 21 and a wavelength separation circuit 22. The receiving apparatus 20 according to the present example embodiment includes n optical receivers 21 from an optical receiver 21-1 to an optical receiver 21-n. The receiving apparatus 20 may include the optical receivers 21 in such a way as to receive optical signals transmitted from each of a plurality of transmitting apparatuses 10. Further, the optical transmitters 11 of the transmitting apparatus 10 and the optical receivers 21 of the receiving apparatus 20 may be provided in the same number in such a way as to have a one-to-one association between the two apparatuses.

Each configuration of the optical receivers 21 will be described. The optical receivers 21 each include a coherent receiver 201, a local beam source 202, a level detection circuit 211, a reference value storage unit 212, a control circuit 213, and a communication circuit 214.

Figure 5:
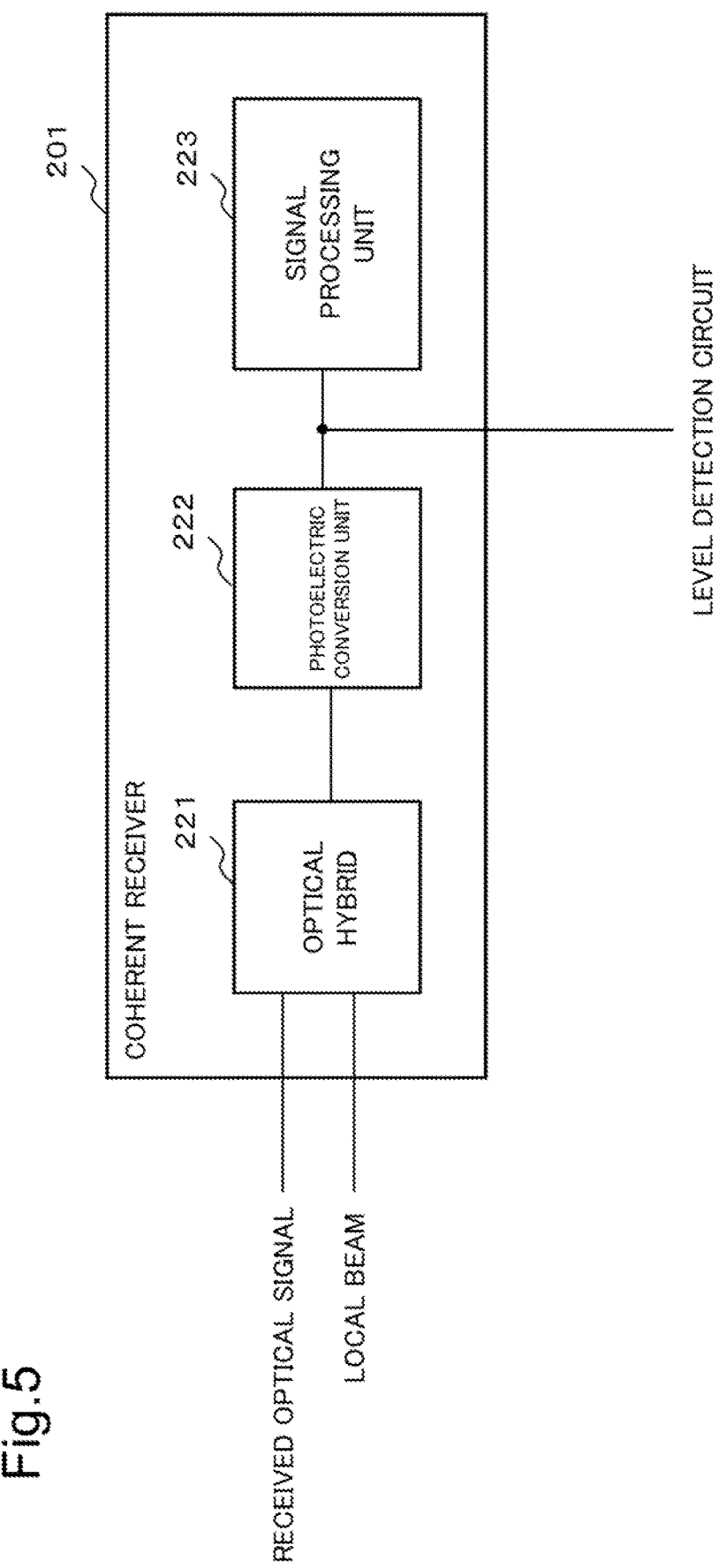
FIG. 5 is a diagram illustrating a part of the configuration of the receiving apparatus according to the second example embodiment of the present invention.

A configuration of the coherent receiver 201 will be described. FIG. 5 illustrates the configuration of the coherent receiver 201 according to the present example embodiment. The coherent receiver 201 includes an optical hybrid 221, a photoelectric conversion unit 222, and a signal processing unit 223.

The optical hybrid 221 interferes the optical signal being input via the transfer path with the local beam being input from the local beam source 202, and outputs the signal to the photoelectric conversion unit 222. The optical hybrid 221 includes a polarization separation unit in an input unit of the optical signal, and causes each of the optical signals separated into an X-polarized wave and a Y-polarized wave to interfere with the local beam through two paths having phases different by 90 degrees.

The photoelectric conversion unit 222 includes a photodiode associated to the optical signal of each channel of the X-polarized wave and the Y-polarized wave, which is output from the optical hybrid 221, converts the optical signal of each channel into an electric signal, and outputs the converted electric signal. The electric signal converted from the optical signal by the photodiode is converted from a current signal to a voltage signal by a transimpedance amplifier, amplified, and input to the signal processing unit 223. A part of the signal to be sent to the signal processing unit 223 is branched for each channel, i.e., for each of an I component and a Q component of the X-polarized wave and the Y-polarized wave, and sent to the level detection circuit 211. The output to the level detection circuit 211 may be performed from a terminal of the transimpedance amplifier.

The signal processing unit 223 converts a signal into a digital signal in the input unit, and performs reception processing such as distortion compensation, polarization separation, and decoding of the signal. The signal decoded by the signal processing unit 223 is output to a communication apparatus or a communication network which is connected to the receiving apparatus 20.

The local beam source 202 outputs continuous light being used as a local beam under control of the control circuit 213. The local beam source 202 sweeps a wavelength of the continuous light to be output under control of the control circuit 213. A center wavelength of the local beam, i.e., a wavelength at which the main signal is detected, is set based on the wavelength of the main signal assigned to the optical receiver 21. When the main signal is being communicated, the local beam source 202 fixes the wavelength of the local beam to the wavelength being set based on the wavelength of the main signal.

The level detection circuit 211 detects an amplitude level of the input voltage signal. The level detection circuit 211 detects an amplitude level of a low frequency component close to a direct current (DC) in signals detected by the coherent receiver 201. The level detection circuit 211 outputs the detected amplitude level to the control circuit 213. The level detection circuit 211 measures, for example, each of signals associated to an I component and a Q component of the X polarization wave and the Y polarization wave, and outputs an average value of amplitude levels of the signals to the control circuit 213.

The reference value storage unit 212 stores data of a spectrum shape, which are set as an ideal spectrum of an optical signal received via the transfer path 30, as a reference spectrum.

Figure 6:
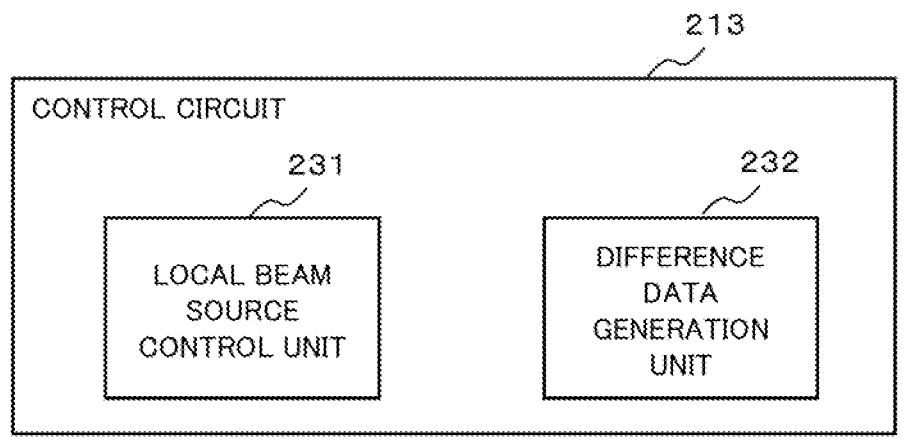
FIG. 6 is a diagram illustrating a part of the configuration of the receiving apparatus according to the second example embodiment of the present invention.

A configuration of the control circuit 213 will be described. FIG. 6 illustrates the configuration of the control circuit 213. The control circuit 213 according to the present example embodiment includes a local beam source control unit 231 and a difference data generation unit 232.

The local beam source control unit 231 controls sweeping of an output wavelength of the local beam source 202. The local beam source control unit 231 sweeps the wavelength of the local beam when generating difference data from the reference spectrum by measuring the received spectrum. As for the local beam source control unit 231, when communication of the main signal is being performed, the local beam source 202 fixes the wavelength of the local beam to the wavelength being set based on the wavelength of the main signal.

The difference data generation unit 232 generates spectrum data of the received optical signal, based on the measurement result being input from the level detection circuit 211. The difference data generation unit 232 calculates a sum of the amplitude level of each of the components being input from the level detection circuit 211 for each wavelength of the local beam. Instead of the sum of the amplitude level of each of the components being input from the level detection circuit 211, the difference data generation unit 232 may calculate an average value or the like for each wavelength of the local beam. The difference data generation unit 232 converts the wavelength of the local beam into the wavelength of the main signal, based on a difference between the wavelength of the local beam and the center wavelength of the optical signal, and generates spectrum data of the main signal, based on the data being input from the level detection circuit 211.

Note that the conversion refers to acquiring a wavelength of the optical signal from a wavelength of a beat signal acquired by causing the local beam and the optical signal to interfere with each other.

The difference data generation unit 232 compares a shape of an optical spectrum of the received optical signal with the reference data, and generates a difference between the reference data and the optical spectrum shape as difference data. The difference data generation unit 232 sends the generated difference data to the optical transmitter 11 associated to the transmitting apparatus 10 via the communication circuit 214.

The communication circuit 214 transmits data to the optical transmitter 11 associated to the transmitting apparatus 10. The associated optical transmitter 11 refers to the optical transmitter 11 of a transmission source of the main signal sent to the optical receiver 21 provided with the communication circuit 214. The communication circuit 214 transmits data to the optical transmitter 11 via a communication line for an optical supervisory channel (OSC), for example.

The wavelength separation circuit 22 separates the wavelength multiplexed signal into optical signals of each wavelength via a transfer path. The wavelength separation circuit 22 is configured by using, for example, the AWG.

The transfer path 30 is configured by using an optical fiber cable. A repeating apparatus such as an optical amplifier may be provided on the transfer path 30. The optical signal may be branched or inserted by providing an optical branch insertion apparatus on the transfer path 30.

An operation of the optical transfer system according to the present example embodiment will be described. First, a normal operation of transferring an optical signal will be described.

When a signal of each channel transferred through the transfer path 30 is input to the transmitting apparatus 10, the signal of each channel is input to the optical transmitter 11 associated to each channel.

When a signal for transmission is input, the optical transmission circuit 101 of the optical transmitter 11 encodes the input signal. When encoding is performed, the optical transmission circuit 101 performs phase modulation on continuous light being output from the light source in the modulator, and outputs a phase modulated signal to the variable filter unit 102. The optical transmission circuit 101 generates a phase modulated signal associated to a digital coherent communication method.

When the modulated optical signal is input, the variable filter unit 102 shapes a spectrum of the input optical signal and outputs the shaped spectrum to the wavelength multiplexing circuit 12. Based on the control signal being input from the control circuit 111, the variable filter unit 102 adjusts the transmittance for each wavelength and shapes the spectrum of the input optical signal.

The optical signal associated to each of the channels being output from each of the optical transmitters 11 is multiplexed by the wavelength multiplexing circuit 12, and is output as a wavelength multiplexed signal to the transfer path 30.

The wavelength multiplexed signal being output to the transfer path 30 is transferred through the transfer path 30 and is input to the receiving apparatus 20. The wavelength multiplexed signal being input to the receiving apparatus 20 is separated and is output to each optical receiver 21 associated to each wavelength.

The optical signal being input to the optical receiver 21 is input to the coherent receiver 201. When the optical signal received via the transfer path 30 is input, the coherent receiver 201 causes the optical signal to interfere with the local beam being output from the local beam source 202. The wavelength of the local beam being output from the local beam source 202 is maintained at a constant wavelength which is set based on the wavelength of the main signal. The optical signal interfering with the local beam is converted into an electric signal by the photoelectric conversion unit. The signal converted into the electric signal is converted into a digital signal and then subjected to reception processing such as decoding processing, and thus the resultant is output.

A part of the signal converted into the electric signal is input to the level detection circuit 211, and an amplitude level is measured.

Next, an operation of the optical receiver 21 when measuring a spectrum of the received optical signal and generating difference data from the reference spectrum will be described. The optical receiver 21 measures the spectrum of the received optical signal at a time of start-up, adjustment, or the like of the optical transfer system, and generates difference data from the reference spectrum.

When the operation of generating difference data is started, the control circuit 213 sweeps an oscillation wavelength of the local beam source 202. The control circuit 213 sweeps the wavelength of the local beam in a wavelength region equivalent to a bandwidth of one channel around the center wavelength of the optical signal assigned to the optical receiver 21.

When the wavelength of the local beam is swept, the electric signal converted from the optical signal is input to the level detection circuit 211. The level detection circuit 211 extracts a low frequency component close to DC of the input electric signal, and measures an amplitude level. When the amplitude level is measured, the level detection circuit 211 outputs the measured amplitude level to the control circuit 213.

Upon receipt of amplitude level data, the control circuit 213 stores the amplitude level data in association with the wavelength of the local beam at a time when the amplitude level has been measured. When sweeping of the wavelength of the local beam is completed, the control circuit 213 generates spectrum data, based on the amplitude level data for each wavelength of the local beam. The control circuit 213 converts the wavelength of the local beam into the wavelength of the optical signal, based on a difference between a set value of the wavelength of the local beam and the center value, and based on a center wavelength of the received main signal, and generates data of the spectrum associated to the received optical signal.

When the spectrum data are generated, the control circuit 213 reads out reference spectrum data stored in the reference value storage unit 212, calculates a level difference between the spectrum based on the received optical signal and each wavelength of the reference spectrum, and generates difference data. The control circuit 213, for example, normalizes the level of each wavelength of the spectrum based on the measurement result by the level at the center wavelength, and compares the reference spectrum data.

After generating the difference data, the control circuit 213 sends the generated difference data to the optical transmitter 11 of the transmitting apparatus 10 via the communication circuit 214. The difference data are sent to the associated optical transmitter 11, i.e., the optical transmitter 11 of a transmission source of the optical signal which is a source of the difference data, via an OSC line for management, for example.

When the difference data are received from the optical receiver 21 of the transmission destination of the optical signal, the communication circuit 112 of the optical transmitter 11 of the transmitting apparatus 10 sends the received difference data to the control circuit 111. Upon receiving the difference data, the control circuit 111 generates data of a correction value of a transmission characteristic in the variable filter unit 102 in such a way as to correct a spectrum difference detected by the receiving circuit (difference data generated by the control circuit 213). The control circuit 111 stores data of a correction amount of the transmission characteristic for each wavelength with respect to the difference data in advance.

Figure 7:
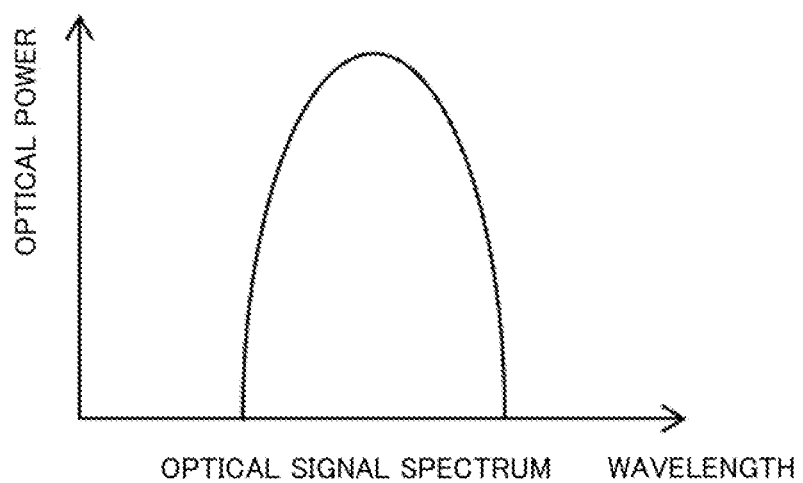
FIG. 7 is a diagram schematically illustrating a spectrum of an optical signal being output from an optical transmission circuit according to the second example embodiment of the present invention.
Figure 8:
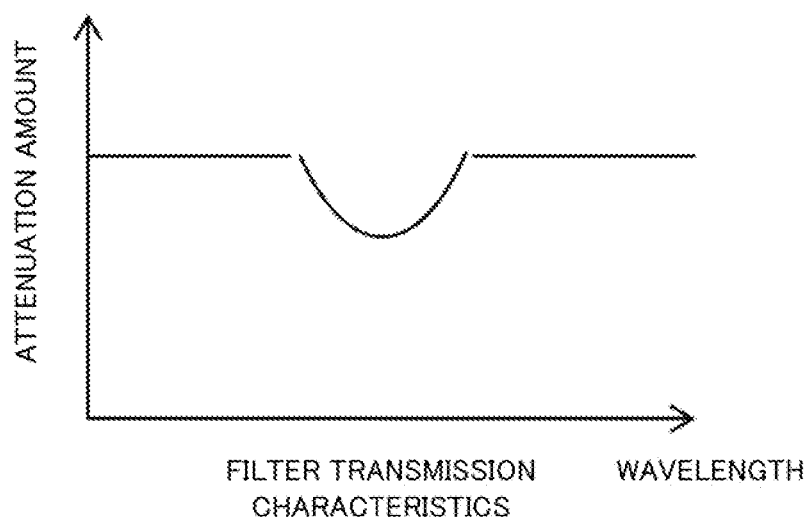
FIG. 8 is a diagram schematically illustrating transmission characteristics of a variable filter unit according to the second example embodiment of the present invention.
Figure 9:
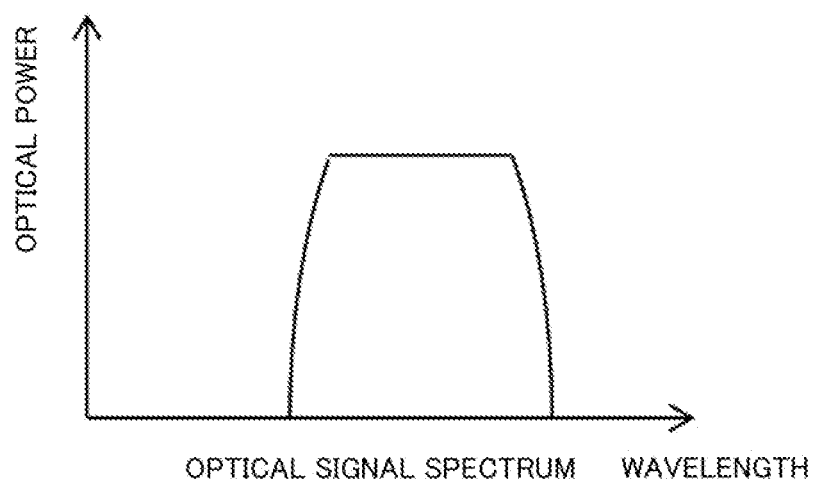
FIG. 9 is a diagram schematically illustrating a spectrum of an optical signal to be transmitted from an optical transmitter according to the second example embodiment of the present invention.

FIG. 7 is a diagram schematically illustrating a spectrum of an optical signal being output from the optical transmission circuit 101. FIG. 8 is a diagram schematically illustrating an example of setting a transmittance for each wavelength when the optical signal having a shape as illustrated in FIG. 7 is subjected to filter processing. FIG. 9 is a diagram schematically illustrating an example of the spectrum of the optical signal after the filter processing is performed.

In the filter processing as illustrated in FIG. 8, the spectrum of the optical signal is flattened as illustrated in FIG. 9 by decreasing the transmittance near the center wavelength and increasing an attenuation amount. An output signal of the variable filter unit 102 preferably has a shape close to a rectangular wave.

In a case where optical power is adjusted per channel by a variable optical attenuator (VOA) or the like, when the peak of the signal is lowered, the optical power of the entire channel is lowered while the spectral shape as illustrated in FIG. 7 is maintained, and the spectrum shape is slimmed. Meanwhile, in the optical transfer system according to the present example embodiment, since the spectrum is adjusted according to the difference data in one channel, it is possible to maximize the optical power while suppressing the peak value.

When the data of the correction value of the transmission characteristic are generated, the control circuit 111 sets the transmittance for each wavelength in the variable filter unit 102, based on the data of the correction amount of the transmission characteristic, and outputs a control signal based on a new set value to the variable filter unit 102. When the control signal based on the new set value is input, the variable filter unit 102 performs filter processing on the optical signal in such a way as to have a transmission characteristic based on the control signal, and starts outputting an optical signal having a spectrum shape whose adjustment amount is corrected.

As for the optical transfer system according to the present example embodiment, in the optical receiver 21 of the receiving apparatus 20, the wavelength of the local beam is swept, and the spectrum of the optical signal equivalent to the wavelength region of one channel is acquired. The optical transfer system generates a difference between the spectrum of the optical signal on the receiving side and the reference data as difference data, and performs spectrum shaping on the output signal in the wavelength region of one channel, based on the difference data in the optical transmitter 11 of the transmitting apparatus 10 on the transmitting side. In this manner, by shaping the spectrum on the transmitting side according to the measurement result of the received signal, it is possible to suppress signal deterioration due to waveform distortion caused by a nonlinear effect in a transfer path or the like. As a result, the optical transfer system according to the present example embodiment can suppress the waveform distortion while maintaining the optical power, and thus can stabilize a reception characteristic of the optical signal to be transferred via the transfer path.

In the optical transfer system according to the second example embodiment, the difference data are generated in the optical receiver on the receiving side, and the difference data are transmitted to the transmitting side. Instead of such a configuration, the spectrum data equivalent to the optical signal received from the optical receiver on the receiving side may be transmitted to the optical transmitter on the transmitting side, and the transmitter may adjust the transmittance at a time of filter processing according to the spectrum of the received signal.

Although the optical transfer system according to the second example embodiment performs transfer of an optical signal in one direction from the transmitting apparatus to the receiving apparatus, it may be configured to perform bidirectional communication by using an optical transfer apparatus having functions of the transmitting apparatus and the receiving apparatus. In such a configuration, the difference data generated on the receiving side may be superimposed on the main signal in the opposite direction as a low-frequency signal and may be transmitted to the transmitting side. With such a configuration, it is unnecessary to transmit and receive data for spectrum shaping via a line for communication management, and thus the structure may be simplified.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2019-056434, filed on Mar. 25, 2019, the disclosure of which is incorporated herein in its entirety by reference.

REFERENCE SIGNS LIST

1 Local beam output means
2 Light receiving means
3 Photoelectric conversion means
4 Measuring means
5 Control means
6 Comparing means
10 Transmitting apparatus
11 Optical transmitter
12 Wavelength Multiplexing Circuit
101 Optical transmission circuit
102 Variable filter unit
111 Control circuit
112 Communication circuit
20 Receiving apparatus
21 Optical receiver
22 Wavelength separation circuit
30 Transfer path
101 Optical transmission circuit
102 Variable filter unit
111 Control circuit
112 Communication circuit
201 Coherent receiver 202 Local beam source
211 Level detection circuit
212 Reference value storage unit
213 Control circuit
214 Communication circuit
221 Optical hybrid
222 Photoelectric conversion unit
223 Signal processing unit
231 Local beam source control unit
232 Difference data generation unit

What is claimed is:

1. An optical transfer system comprising an optical transmitter and an optical receiver, wherein the optical receiver includes:
   a local beam output portion configured to output a local beam by changing a wavelength;
   a light receiver configured to receive a first optical signal being input from the optical transmitter via a transfer path by interfering the first optical signal with the local beam, and output the received first optical signal as a received optical signal;
   a photoelectric converter configured to convert the received optical signal into an electric signal;
   a measure portion configured to measure an amplitude level of the electric signal being converted by the photoelectric converter;
   a controller configured to sweep a wavelength of the local beam; and
   a compare portion configured to generate difference data between a spectrum based on a result of measuring, by the measure portion, an amplitude level of the electric signal in response to a change in a wavelength of the local beam, and a preset reference spectrum, when the controller sweeps a wavelength of the local beam within a predetermined wavelength range centered on a center wavelength of the first optical signal, and
   the optical transmitter includes:
   a signal generator configured to output a second optical signal via the transfer path; and
   an adjuster configured to adjust an intensity of the second optical signal being output from the signal generator, based on the difference data, and output the adjusted second optical signal to the transfer path.

2. The optical transfer system according to claim 1, wherein the measure portion measures an amplitude level of the electric signal equivalent to a low-frequency component of the received optical signal.

3. The optical transfer system according to claim 1, wherein the compare portion converts a wavelength of the local beam into a wavelength of the first optical signal, and generates the difference data.

4. The optical transfer system according to claim 1, wherein the controller sweeps a wavelength of the local beam in a range of a same width as a wavelength region of one channel of a main signal.

5. The optical transfer system according to claim 1, wherein
   the optical receiver transmits the difference data associated to the first optical signal being received from the signal generator of the optical transmitter via the transfer path, to the optical transmitter, and
   the adjuster of the optical transmitter sets an adjustment amount for each waveform of the second optical signal, based on the difference data being received from the optical receiver.

6. The optical transfer system according to claim 5, wherein the controller of the optical receiver fixes a wavelength of the local beam to a wavelength associated to a center wavelength of a main signal when receiving the main signal.

7. An optical communication method comprising:
   generating a first optical signal being transmitted via a transfer path;
   outputting a local beam;
   receiving the first optical signal being input via the transfer path by interfering the first optical signal with the local beam, and outputting the received first optical signal as a received optical signal;
   converting the received optical signal into an electric signal;
   sweeping a wavelength of the local beam within a predetermined wavelength range centered on a center wavelength of the first optical signal;
   measuring the electric signal for each wavelength of the local beam;
   generating difference data between a spectrum based on a result of measuring the electric signal in response to a change in a wavelength of the local beam, and a preset reference spectrum;
   acquiring the difference data from a transmission destination of the first optical signal;
   setting an adjustment amount when adjusting a waveform of a second optical signal, based on the acquired difference data;
   adjusting a waveform of the second optical signal, based on the set adjustment amount; and
   transmitting the second optical signal to the transfer path.

* * * * *